(12) United States Patent
Torrezan et al.

(10) Patent No.: US 12,305,040 B2
(45) Date of Patent: May 20, 2025

(54) BIODEGRADABLE AND/OR COMPOSTABLE THERMOPLASTIC COMPOSITION COMPRISING LIGNIN, USE OF SAID COMPOSITION AND PRODUCT COMPRISING SAME

(71) Applicants: Fundação Universidade Federal de São Carlos, São Carlos (BR); Suzano S.A., Pituba (BR)

(72) Inventors: Talyta Torrezan, Araras (BR); José Augusto Marcondes Agnelli, São Carlos (BR); Sílvia Helena Prado Bettini, São Carlos (BR)

(73) Assignees: Fundação Universidade Federal de São Carlos, São Carlos (BR); Suzano S.A., Pituba (BR)

( * ) Notice: Subject to any disclaimer, the term of this patent is extended or adjusted under 35 U.S.C. 154(b) by 895 days.

(21) Appl. No.: 17/311,152

(22) PCT Filed: Dec. 4, 2019

(86) PCT No.: PCT/BR2019/050521
§ 371 (c)(1),
(2) Date: Jun. 4, 2021

(87) PCT Pub. No.: WO2020/113302
PCT Pub. Date: Jun. 11, 2020

(65) Prior Publication Data
US 2022/0025183 A1    Jan. 27, 2022

(30) Foreign Application Priority Data
Dec. 5, 2018   (BR) .................. 102018075225-1

(51) Int. Cl.
*C08L 67/02* (2006.01)
*C08L 67/04* (2006.01)
(Continued)

(52) U.S. Cl.
CPC ............. *C08L 97/005* (2013.01); *C08L 67/02* (2013.01); *C08L 67/04* (2013.01); *C08L 3/02* (2013.01);
(Continued)

(58) Field of Classification Search
CPC ........ C08L 97/005; C08L 67/02; C08L 67/04; C08L 2203/18; C08L 3/02
See application file for complete search history.

(56) References Cited

U.S. PATENT DOCUMENTS 6,284,838 B1    9/2001   Silbiger
7,354,656 B2 *  4/2008   Mohanty ................ E04F 15/10
                                                      524/114
(Continued)

FOREIGN PATENT DOCUMENTS

CN    105820520 A  *  8/2016
CN    108410148 A     8/2018
(Continued)

OTHER PUBLICATIONS

Chen, R., Abdelwahab, M. A., Misra, M., & Mohanty, A. K. (2014). Biobased ternary blends of lignin, poly (lactic acid), and poly (butylene adipate-co-terephthalate): The effect of lignin heterogeneity on blend morphology and compatibility. Journal of Polymers and the Environment, 22(4), 439-448.
(Continued)

*Primary Examiner* — Michael M Dollinger
(74) *Attorney, Agent, or Firm* — Sheppard Mullin Richter & Hampton LLP

(57) ABSTRACT

The present invention relates to a biodegradable and/or compostable thermoplastic composition comprising lignin, rigid polymers, and flexible polymers for producing rigid parts, as well as the use of said composition. A product
(Continued)

comprising the biodegradable and/or compostable thermoplastic composition is also disclosed.

26 Claims, 1 Drawing Sheet

(51) Int. Cl.
 *C08L 97/00* (2006.01)
 *C08L 3/02* (2006.01)
(52) U.S. Cl.
 CPC ....... *C08L 2201/06* (2013.01); *C08L 2203/18* (2013.01); *C08L 2205/035* (2013.01)

(56) References Cited

U.S. PATENT DOCUMENTS

| | | | |
|---|---|---|---|
| 9,309,401 B2 | 4/2016 | Mohanty et al. | |
| 2009/0171037 A1* | 7/2009 | Aoshima | C08L 67/02 |
| | | | 525/418 |
| 2012/0071591 A1* | 3/2012 | Mohanty | C08L 97/005 |
| | | | 524/72 |
| 2013/0281582 A1* | 10/2013 | Dorgan | C08L 67/04 |
| | | | 527/400 |

FOREIGN PATENT DOCUMENTS

| | | | | |
|---|---|---|---|---|
| CN | 109233214 A | | 1/2019 | |
| FR | 2965815 A1 | * | 4/2012 | ............... C08L 1/12 |
| GB | 2470911 A | | 12/2010 | |
| JP | H07179654 A | | 7/1995 | |
| JP | 2002088246 A | | 3/2002 | |
| JP | 2002114896 A | | 4/2002 | |
| JP | 2003113326 A | | 4/2003 | |
| JP | 2010065214 A | | 3/2010 | |
| KR | 20010073648 A | | 8/2001 | |
| KR | 20020077056 A | | 10/2002 | |
| KR | 20130116481 A | | 10/2013 | |
| RU | 2004205 C1 | | 12/1993 | |
| TW | 201433602 A | * | 9/2014 | |
| WO | 1995/034604 A1 | | 12/1995 | |
| WO | 2011/080623 A2 | | 7/2011 | |
| WO | WO-2017087264 A1 | * | 5/2017 | ............... B01J 2/006 |

OTHER PUBLICATIONS

Cazacu, G., Pascu, M. C., Profire, L., Kowarski, A. I., Mihaes, M., & Vasile, C. (2004). Lignin role in a complex polyolefin blend. Industrial Crops and Products, 20(2), 261-273.

Abdelwahab, M. A., Taylor, S., Misra, M., & Mohanty, A. K. (2015). Thermo-mechanical characterization of bioblends from polylactide and poly (butylene adipate-co-terephthalate) and lignin. Macromolecular Materials and Engineering, 300(3), 299-311.

Livi, S., Bugatti, V., Marechal, M., Soares, B. G., Barra, G. M., Duchet-Rumeau, J., & Gérard, J. F. (2015). Ionic liquids-lignin combination: an innovative way to improve mechanical behaviour and water vapour permeability of eco-designed biodegradable polymer blends. RSC Advances, 5(3), 1989-1998.

Ouyang, W. Z., Huang, Y., Luo, H. J., & Wang, D. S. (2012). Preparation and properties of poly (lactic acid)/cellulolytic enzyme lignin/PGMA ternary blends. Chinese Chemical Letters, 23(3), 351-354.

Adams, B., Abdelwahab, M., Misra, M., & Mohanty, A. K. (2018). Injection-molded bioblends from lignin and biodegradable polymers: processing and performance evaluation. Journal of Polymers and the Environment, 26(6), 2360-2373.

Rahman, M. A., De Santis, D., Spagnoli, G., Ramorino, G., Penco, M., Phuong, V. T., & Lazzeri, A. (2013). Biocomposites based on lignin and plasticized poly (L-lactic acid). Journal of Applied Polymer Science, 129(1), 202-214.

International Search Report and Written Opinion for PCT/BR2019/050521 dated Feb. 4, 2020, 15 pages. English translation of ISR only.

* cited by examiner

BIODEGRADABLE AND/OR COMPOSTABLE THERMOPLASTIC COMPOSITION COMPRISING LIGNIN, USE OF SAID COMPOSITION AND PRODUCT COMPRISING SAME

CROSS-REFERENCE TO RELATED APPLICATIONS

This application is a U.S. National Stage Application under 35 U.S.C. 371 of International Application No. PCT/BR2019/050521, filed Dec. 4, 2019, which claims priority to Brazil patent application Ser. No. 102018075225-1, filed Dec. 5, 2018. The contents of each of the aforementioned are hereby incorporated by reference in their entirety into the present disclosure.

FIELD OF THE INVENTION

The present invention relates to a biodegradable and/or compostable thermoplastic composition comprising lignin, rigid polymers, and flexible polymers for the production of rigid parts, as well as to the use of said composition.

A product comprising the biodegradable and/or compostable thermoplastic composition is also disclosed.

BACKGROUND OF THE INVENTION

The demand for environmental sustainability and consequently for materials from renewable and/or biodegradable sources has increased at a very significant level in recent years.

In this context, biopolymers offer an interesting solution for maintaining ecologically sustainable development, as they can provide the preservation of fossil-based raw material, reduction of waste volume with compostability in the natural cycle, as well as climate protection by reducing released carbon dioxide. However, even with so many environmental benefits, biopolymers still suffer to overcome some economic and technical barriers.

Despite facing such challenges, the global capacity of the bioplastics industry was projected by the Institute for Bioplastics and Biocomposites (IfBB) to reach around 9.4 million ton/year in 2020—according to the IfBB report from 2016, entitled "Biopolymers: facts and statistics", Hochschule Hannover, University of Applied Sciences and Arts—which translates to an expectation of a very significant increase in 5 years, considering the production from 2015, which was approximately 2.0 million tons. It is further worth noting that about 64% of this amount was comprised of materials from renewable sources but not biodegradable, and this trend continues increasing to 82% in 2020.

This scenario shows that there is now wider acceptance of biopolymers, using the same pre-existing infrastructure network as the conventional ones, such as Bio-PET and Bio-PE, for example. Biodegradable materials, on the other hand, face great challenges to overcome economic obstacles, as they need different equipment and structures, which ends up requiring extra investments making it difficult to reach financial feasibility.

The paper and cellulose industry is a great opportunity to supply renewable inputs at economically feasible rates, as it is already comprised in the industry structure. This is in line with discussions, biorefineries developments and launches and with the integration of biomass conversion processes to produce energy, biofuels, biomaterials, and chemicals having high value added. The ongoing transformation of paper and cellulose industries to forest-based companies is noticeable, aiming to add maximum value to their forests by taking advantage of opportunities arising from environmental pressures and the needs of changing markets.

An example of this transformation is lignin, which is one of the components of biomass and, in the past, was essentially treated as a by-product obtained during the extraction of cellulose, being burned for power generation in the paper and cellulose industries. Currently, lignin has increased in value, recovered and converted into products with great potential for replacing raw material from fossil sources, or even products entering new field and applications.

Capacity around the world for lignin production is estimated at 50 million ton/year, although still approximately 98% of that amount is immediately burned to generate heat and energy that feed the pulp and paper industries. However, as mentioned, this scenario has undergone changes. The amount of isolated and marketed lignin was 1.1 million tons in 2014. The global lignin market, on the other hand, reached a value of approximately 775 million USD in that same year and is expected to reach around 900 million USD in 2020, with the evolution of market and with new players therein, which corresponds to an increase of 2.5% in 5 years ("Polymer/Lignin blends: Interactions, properties, applications", Kun, Dávid & Pukánszky, Béla, European Polymer Journal, 2017 and "Lignin Market (Lignosulfonates, Kraft Lignin and Others) for Concrete Additive, Animal Feed, Dye Stuff, and Other Applications: Global Industry Perspective, Comprehensive Analysis and Forecast 2014-2020", Zion Research, Market Research Store, Deerfield Beach, 2015).

Lignin is the largest source of aromatics present in nature and therefore an enormous opportunity for renewable material. Regarding contents, grasses contain from 17 to 24% by weight of lignin, the so-called softwoods contain 18 to 25% by weight of lignin, and hardwood from 27 to 33% by weight of lignin ("Polymer/Lignin blends: Interactions, properties, applications", Kun, Dávid & Pukánszky, Béla, European Polymer Journal, 2017, and "Lignin and Lignans as Renewable Raw Materials: Chemistry, Technology and Applications", F. G. Calvo-Flores et al., Wiley, Hoboken, 2015).

Furthermore, there is a current need for the development of sustainable solutions not only environmentally but also in technical and economic terms for the field of rigid plastic products, using biodegradable materials and preferably from renewable sources.

Currently many green plastics are not biodegradable, despite being produced from chemical intermediates obtained from biochemical routes and/or from renewable sources, so that the impact of the final product is the same as that of an oil-based material when discarded. The current challenge is the search for materials which are biodegradable and still guarantee good workability for the final product.

There is a complexity tied to biodegradation, since the chemical structures of the polymers presenting this characteristic are quite different from conventional polyolefins. Biodegradable polymers are more susceptible to degradation processes and harder to work with.

In addition to the technical challenge, biodegradable polymers have a very high cost, usually having around at least three times the price of conventional polymers. Therefore, incorporating high contents of lignin is necessary to achieve technical and economic feasibility in view of its low cost. However, although the incorporation of high contents of lignin reduces the cost of the desired composition/mixture, this also leads to an increase in its complexity, especially regarding applications in rigid parts. This is justified because lignin is rigid in the solid state but does not present sufficient strength for a good processing of plastic transformations, such as injection, in final parts in the molten state, for example.

Therefore, it is necessary to include a component having strength in the molten state (rigid component). However, when this rigid component is added, the final properties of the part are extremely high in stifness and fragility, not being widely applicable and technically feasible, so it is necessary to include another component providing the necessary ductility and impact resistance in the solid state (flexible component). However, this last flexible component brings even more complexity to the molten state, as they are components of antagonistic characteristics.

Thus, there is a need for compositions with high contents of lignin comprising both rigid and flexible components which overcome said technical challenges, to obtain products with good processing characteristics and final properties.

In this context, there are documents in the state of the art which disclose compositions containing lignin, and other components, such as polymers. However, they do not overcome the technical, environmental, and economic challenges currently found.

The document entitled "Biobased Ternary Blends of Lignin, Poly(Lactic Acid), and Poly(Butylene Adipate-co-Terephthalate): The Effect of Lignin Heterogeneity on Blend Morphology and Compatibility", Chen et al., describes mixtures of lignins with poly(butylene adipate-co-terephthalate) (PBAT) and poly(lactic acid) (PLA). The document discloses lignin fractionation and the effect of different lignin fractions on compatibility and dispersion in PBAT and PLA compositions. However, it does not disclose how to balance the properties of individual components to obtain parts with high stiffness.

The document entitled "Thermo-mechanical characterization of bioblends from polylactide and poly(butylene adipate-co-terephthalate) and lignin", Abdelwahab et al., describes the effect of incorporating an Organosolv lignin and a chain extender on the compatibility between poly (lactic acid) (PLA) and poly(butylene adipate-co-terephthalate) (PBAT). This document assesses the use of lignin together with a chain extender. This reaction process alters the product's structure, making it very different from the composition of the present invention, which only comprises the incorporation of lignin without a reaction process.

The document entitled "Ionic liquids-lignin combination: an innovative way to improve mechanical behaviour and water vapour permeability of eco-designed biodegradable polymer blends", Livi et al., presents a study of the properties of biodegradable polymer mixtures with the use of lignin combined with ionic liquids. Although the document mentions the properties of the mixture between lignin, PBAT and PLA, the focus of the study is to analyze the influence of ionic liquids used as compatibility agents in mixtures of biodegradable polymers reinforced with a renewable resource, such as lignin. In addition, the analyzed samples do not have high contents of lignin. For example, nanocomposites were prepared based on PBAT, PLA, lignin, and ionic liquids, in which the percentages by weight of the components used were: 64% of PBAT, 16.5% of PLA, 16.5% of lignin, and 1% of ionic liquids.

WO 2009/043580 discloses a formulation for the production of a forestry biodegradable container, composed of poly(lactic acid), lignocellulose fibers, lubricating additives, plastifiers, crystallinity modifiers, compatibilizers and functional additives. Unlike previously cited documents, WO 2009/043580 does not disclose a composition comprising lignin per se, but rather a composition containing lignocellulosic fibers. It should be noted that although plant lignocellulosic biomass is mainly composed of cellulose, hemicellulose and lignin, the processes to isolate lignin from lignocellulosic biomass generate structural changes and scissions in the native lignin chain. Therefore, the extracted lignin does not present the same characteristics and effects into the application of the lignin contained in the lignocellulosic fiber.

Therefore, there is a need in the state of the art for a composition comprising high contents of lignin applicable in rigid parts which can overcome the current technical, environmental, and economic challenges.

SUMMARY OF THE INVENTION

Described herein is a biodegradable and/or compostable thermoplastic composition comprising 30 to 70% by weight of lignin; 10 to 60% by weight of a rigid polymer; and 10 to 40% by weight of a flexible polymer.

In a preferred embodiment, the composition comprises 40 to 50% by weight of lignin.

In a preferred embodiment, the composition comprises 20 to 40% by weight of a rigid polymer.

In a preferred embodiment, the composition comprises 20 to 30% by weight of a flexible polymer.

In one embodiment of the invention, the rigid polymer has a tensile elastic modulus from 1800 to 4600 MPa. In a preferred embodiment, the rigid polymer has a tensile elastic modulus of 2700 to 4200 MPa.

In one embodiment of the invention, the rigid polymer has a flexural elastic modulus from 2000 to 5000 MPa. In a preferred embodiment, the rigid polymer has a flexural elastic modulus of 3000 to 4500 MPa.

In one embodiment of the invention, the flexible polymer has a tensile elastic modulus from 50 to 1000 MPa. In a preferred embodiment, the flexible polymer has a tensile elastic modulus from 100 to 500 MPa.

In one embodiment, the rigid polymer or/and the flexible polymer is/are selected from the group consisting of bioplastics from renewable or nonrenewable, biodegradable and/or compostable sources.

In an optional embodiment of the invention, the biodegradable and/or compostable thermoplastic composition further comprises a biodegradation rate accelerator.

The biodegradation rate accelerator is selected from the group consisting of polysaccharides or lignocellulosic materials.

In one embodiment, the biodegradation rate accelerator is the starch, the thermoplastic starch and/or cellulose.

In one embodiment of the invention, the biodegradable and/or compostable thermoplastic composition is used in the production of rigid parts.

In one embodiment of the invention, the rigid parts are intended for application in sectors selected from the group consisting of forestry, agricultural, of packaging and consumer goods, automotive or civil construction sectors.

In one embodiment of the invention, the rigid parts are in the form of tubes. In a preferred embodiment, the tubes are for application in the forestry and/or agricultural sector.

Also described herein is the use of the biodegradable and/or compostable thermoplastic composition of the invention for plastics transformation processes.

Also described herein is the use of the biodegradable and/or compostable thermoplastic composition of the invention for the manufacture of rigid parts.

In one embodiment, the use of the biodegradable and/or compostable thermoplastic composition of the invention can be in any application using rigid biodegradable parts. Preferably, the rigid part is intended for application in sectors selected from the group consisting of forestry, agricultural, of packaging and consumer goods, automotive or civil construction sectors.

In one embodiment of the invention, the use of the biodegradable and/or compostable thermoplastic composition of the invention is intended for the manufacture of rigid pieces in the form of tubes.

In one embodiment of the invention, the use of the biodegradable and/or compostable thermoplastic composition of the invention is intended for the manufacture of rigid parts in the form of tubes for application in the forestry and/or agricultural sector.

Further disclosed is a product comprising the biodegradable and/or compostable thermoplastic composition of the invention.

In one embodiment of the invention, the product is in the form of a rigid part.

In a preferred embodiment, the product is in the form of a rigid part, which presents from about 0.3 mm thick.

DETAILED DESCRIPTION OF THE INVENTION

Figure 1:
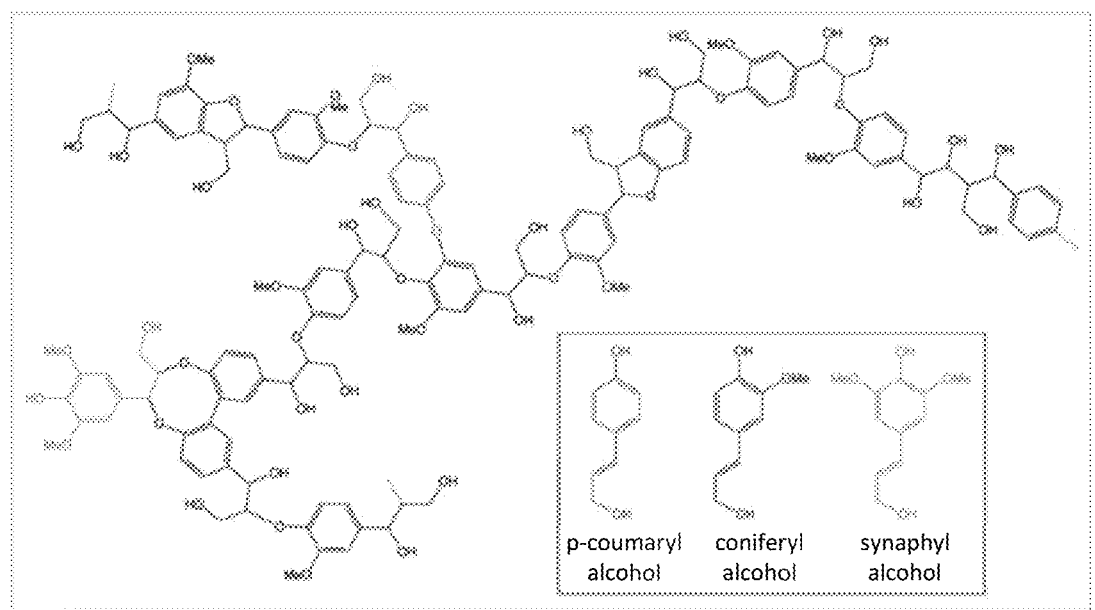
FIG. 01 represents the generic chemical structure supposed for lignin.

The biodegradable and/or compostable thermoplastic composition of the present invention combines rigid polymers, flexible polymers, lignin, and optionally biodegradation rate accelerators, so that the balance of the proportions of said constituents leads to obtaining biodegradable rigid parts with good mechanical properties.

The biodegradable and/or compostable thermoplastic composition of the invention is capable of being directly transformed into rigid parts by transformation processes conventionally employed in thermoplastics, such as for example extrusion, injection, compression, thermoforming, among others.

Described herein is a biodegradable and/or compostable thermoplastic composition comprising 30 to 70% by weight of lignin, preferably 40 to 50% by weight of lignin; 10 to 60% by weight of a rigid polymer, preferably 20 to 40% by weight of a rigid polymer; and 10 to 40% by weight of a flexible polymer, preferably 20 to 30% by weight of a flexible polymer.

Lignin can be technically defined as an amorphous material derived from dehydrogenative reactions of three types of phenylpropanoids: trans-coniferyl (type-G), trans-synaphyl (type-S) and trans-p-coumaryl (type-H) alcohols, which can be connected in different ways by covalent bonds with no repetitive unit (a characteristic of polymers) but rather a complex arrangement of such precursor units generating macromolecules.

As all-natural matter, lignin presents substantial differences in its composition, structure, and purity, which affect its properties and consequently its application potentials. Such variations depend on the botanical origin, since the ratio of the generating units (H/G/S) changes according to the type of plant. For example, this ratio is 0-5/95-100/0 in softwood, 0-8/25-50/46-75 in hardwood and 5-33/33-80/20-54 in grasses (Kun, Dávid & Pukánszky, Béla. Polymer/Lignin blends: Interactions, properties, applications. European Polymer Journal, 2017, and S. M. Notley, M. Norgren, Lignin: functional biomaterial with potential in surface chemistry and nanoscience, in: L. A. Lucia, O. J. Rojas (Eds.), The Nanoscience and Technology of Renewable Biomaterials, Wiley-Blackwell, Hoboken, p. 173-205, 2009.).

Furthermore, there is another variable that is the process of extracting lignin, as it is impossible to isolate it without chemical changes to its structure. One of the main points affected by the extraction process is the molar mass of the isolated lignin (also called technical lignin), which can be in a very wide range from 260 to 50,000,000 g/mol (Omar Faruk, Mohini Sain. Lignin in Polymer Composites. Elsevier Inc. 2015.). The main processes for extracting lignin from lignocellulosic materials are soda, kraft, sulfite and organosolv (Omar Faruk, Mohini Sain. Lignin in Polymer Composites. Elsevier Inc. 2015; Duval, Antoine & Lawoko, Martin. A review on lignin-based polymeric, micro-, and nano-structured materials. Reactive and Functional Polymers, 85, 2014.; Abdelaziz, Omar & Brink, Daniel & Prothmann, Jens & Ravi, Krithika & Sun, Mingzhe & García-Hidalgo, Javier & Sandahl, Margareta & Hulteberg, Christian & Turner, Charlotta & Lidén, Gunnar & Gorwa-Grauslund, Marie. Biological valorization of low molecular weight lignin. Biotechnology advances, 34, 2016.; Mohamed Naceur Belgacem, Alessandro Gandini. Monomers, Polymers and Composites from Renewable Resources. Elsevier Inc. 2008; and P. Wool, Richard. Lignin Polymers and Composites. p. 551-598, 2005).

Finally, it should be emphasized that lignin has a very complex chemical structure, and that there are models that seek to describe it, but there is no complete definition for it. FIG. 01 shows a supposed formula for such.

The presence of lignin in the composition of the invention facilitates the processing of the composition by reducing its viscosity, enabling operational advantages such as reductions in temperatures and pressures. In addition, lignin has a low cost and the production of compositions using high contents of lignin allows to obtain economically competitive products which can enter applications that are currently not feasible, for example, for bioplastics, due to the high price. Therefore, the composition of the invention can even compete with conventional alternatives (fossil and non-biodegradable source).

Thus, the high contents of lignin in the composition of the invention result in improvements in cost, improvements in the final and process properties of biodegradable polymers and maintenance of the environmental character.

The rigid polymer used in the biodegradable and/or compostable thermoplastic composition of the present invention when in the solid state must have the characteristics of tensile elastic modulus in the range from 1800 to 4600 MPa, preferably 2700 to 4200 MPa, according to the ASTM D638 standard, and flexural elastic modulus from 2000 to 5000 MPa, preferably 3000 to 4500 MPa, according to the ASTM D790 standard.

The rigid polymer is selected from the group consisting of bioplastics from renewable or non-renewable, biodegradable and/or compostable sources. Non-limiting examples of rigid polymers according to the present invention are selected from poly(hydroxyalkanoate) (PHA) and poly(lactic acid) (PLA).

The advantages provided by the presence of the rigid polymer in the biodegradable and/or compostable thermoplastic composition are that said polymer is associated with good processability upon injection and has strength in the molten state.

The flexible polymer used in the biodegradable and/or compostable thermoplastic composition of the present invention must have characteristics of tensile elastic modulus in the range from 50 to 1000 MPa, preferably from 100 to 500 MPa, according to the ISO 527 standard.

The flexible polymer is selected from the group consisting of bioplastics from renewable or non-renewable, biodegradable and/or compostable sources. Non-limiting examples of flexible polymers according to the present invention are selected from poly(butylene adipate-co-terephthalate) (PBAT), polycaprolactone (PCL) and poly(butylene succinate-co-adipate) (PBSA).

The advantages provided by the presence of the flexible polymer in the biodegradable and/or compostable thermoplastic composition are that said polymer promotes impact resistance and ductility in the solid state, as well as being associated with good processability upon extrusion.

As used herein the term "bioplastic" refers to a plastic material from a renewable and/or biodegradable source.

The term "from a renewable source" means that a material or product is derived from biomass. Biomass used for bioplastics is derived, for example, from corn, sugar cane or cellulose.

"Biopolymers" are polymers or copolymers produced from raw materials from renewable and/or biodegradable sources, such as corn, sugarcane, cellulose, chitin, among others.

The term "biodegradation" is defined as a chemical process in which materials are metabolized to water, carbon dioxide and biomass with the aid of microorganisms. The biodegradation process depends on environmental conditions, such as, for example, temperature, inoculum, and humidity, and on the material or application thereof. To define a product's biodegradability, environmental conditions must be specified and a schedule for biodegradation must be established in order to make such definitions measurable and comparable. Some examples of standards are EN 13432, ASTM D6400, ASTM D5338, ISO14855, ASTM 5988, ASTM D6003, ASTM G160, ABNT NBR 15448-1, and ABNT NBR 15448-2.

The term "composting" is defined as a process that controls the biological decomposition and transformation of biodegradable materials into a humus-like substance called as compost. The decomposition of the biodegradable material results in the production of carbon dioxide, water, minerals, and stabilized organic matter (fertilizer or humus). Thus, compostable polymers are those that undergo biodegradation during composting to yield $CO_2$, water, inorganic compounds, and biomass at a rate consistent with other known compostable materials and do not produce visible, distinguishable, or toxic residues.

Compostable polymers which are designed to be eliminated after their useful lives through organic recycling, i.e., composting, represent one of the strategic options available for the managing of plastic waste. Composting is an attractive alternative for reducing solid waste and is especially suitable for sectors of conventional plastics in which recycling is difficult or economically unfeasible.

The compositions of the present invention can be biodegradable and/or compostable.

As used herein, the term "thermoplastic" means a plastic with the ability to soften and flow when subjected to an increase in temperature and pressure, turning into a part with defined shapes after cooling and solidification. New applications of temperature and pressure promote the same softening and flowing effect and new cooling solidify the plastic in defined forms. Thus, thermoplastics can undergo physical transformations in a reversible manner.

In an optional embodiment of the invention, the biodegradable and/or compostable thermoplastic composition further comprises a biodegradation rate accelerator.

The biodegradation rate accelerator is selected from the group consisting of polysaccharides or lignocellulosic materials. Non-limiting examples of polysaccharides include starch, thermoplastic starch, and cellulose. Non-limiting examples of lignocellulosic materials include fibers, fines, and powders.

In one embodiment, the biodegradation rate accelerator is starch, thermoplastic starch and/or cellulose.

The amount of the biodegradation rate accelerator in the biodegradable and/or compostable thermoplastic composition, when present, depends on the desired biodegradation rate.

The biodegradation rate accelerator has the function of increasing the biodegradation rate of the composition and has a competitive price, resulting in economic feasibility.

The constituents of the biodegradable and/or compostable thermoplastic composition can be presented isolated or in polymeric blends/mixtures.

In addition, the constituents of the composition of the invention may have a dual function, comprising two classes at the same time as long as they fit the characteristics/limitations described in the composition. For example, thermoplastic starch can act as a flexible polymer, and biodegradation rate accelerator.

The biodegradable and/or compostable thermoplastic composition of the invention is applicable and have advantages for any plastics transformation process.

In one embodiment of the invention, the biodegradable and/or compostable thermoplastic composition is used in the production of rigid parts.

Rigid parts are intended for application in all sectors in which conventional or biodegradable polymers are used. Non-limiting examples of these sectors are selected from the group consisting of forestry, agricultural, of packaging and consumer goods, automotive or civil construction sectors.

In one embodiment of the invention, the rigid parts are in the form of tubes. In a preferred embodiment, the tubes are for application in the forestry and/or agricultural sector.

Also described herein is the use of the biodegradable and/or compostable thermoplastic composition of the invention for plastics transformation processes.

Also described herein is the use of the biodegradable and/or compostable thermoplastic composition of the invention for the manufacture of rigid parts.

In one embodiment, the use of the biodegradable and/or compostable thermoplastic composition of the invention can be in any application using rigid biodegradable parts. Preferably, the rigid part is intended for application in sectors selected from the group consisting of forestry, agricultural, of packaging and consumer goods, automotive or civil construction sectors.

In one embodiment of the invention, the use of the biodegradable and/or compostable thermoplastic composition of the invention is intended for the manufacture of rigid pieces in the form of tubes.

In one embodiment of the invention, the use of the biodegradable and/or compostable thermoplastic composition of the invention is intended for the manufacture of rigid parts in the form of tubes for application in the forestry and/or agricultural sector.

Further disclosed is a product comprising the biodegradable and/or compostable thermoplastic composition of the invention.

In one embodiment of the invention, the product is in the form of a rigid part.

The biodegradable and/or compostable thermoplastic composition of the present invention promotes fluidity and makes it possible to obtain very thin rigid parts, being possible to generate parts from about 0.3 mm thick—which is considered very thin for rigid parts.

The technical advance of the biodegradable and/or compostable thermoplastic composition of the invention is to present a solution to the biodegradability problem regarding conventional thermoplastics, and to present technical improvements in process and final properties, in addition to cost improvements regarding currently used bioplastics.

Bioplastics normally have a narrow processing window, i.e., restricted processing conditions, being very susceptible to degradative processes. Lignin acts as a stabilizer (thermo-oxidative, thermomechanical, UV radiation, etc.), in addition to a rheological modifier (reduction of viscosity), which results in milder temperatures and shearing rates.

Another relevant factor is that lignin promotes improvements in mechanical properties, such as rigidity and tensile strength, in combination with the lubrication effect during the processing.

Combined with the technical advantages, there is the economic issue, since lignin has a low cost.

It should also be noted that lignin is from renewable and biodegradable and/or compostable source, this combination is not easy to be achieved along with good technical properties and competitive prices.

The biodegradable and/or compostable thermoplastic composition of the present invention comprising high contents of lignin, a rigid polymer, a flexible polymer and, optionally, a biodegradation rate accelerator, in the disclosed amounts, is applicable in rigid parts, has good mechanical properties and overcomes the current technical, environmental, and economic challenges.

EXAMPLE

Presented herein is an example of concretization in order to demonstrate the advantages of the biodegradable and/or compostable thermoplastic composition of the invention.

The study presented in the example shows the improved mechanical properties with the combination of rigid polymer, flexible polymer, and lignin, i.e., it exemplifies the importance of the three components being present in the composition.

This study assesses the mechanical properties of different combinations between a rigid polymer, a flexible polymer, lignin, and a biodegradation rate accelerator. The polymers investigated in this step were poly(hydroxybutyrate) (PHB) and poly(butylene adipate-co-terephthalate) (P BAT).

Tensile tests were performed to verify the mechanical strength of the formulations tested with different dosages of polymers, lignin, and starch, so that the data in Table 1 was obtained. The tensile tests were performed according to the ASTM D638 standard.

TABLE 1

| Results from tensile tests | | | | |
|---|---|---|---|---|
| Formulation | PHB/PBAT/ Lignin/Starch % by weight | Tensile Strength (MPa) | Elongation at Break (%) | Tensile Elastic Module (MPa) |
| 1 | 60/0/40/0 | 18.5 | 0.5 | 4,127 |
| 2 | 30/30/40/0 | 16.2 | 1.3 | 1,603 |
| 3 | 30/30/30/10 | 20.5 | 2.7 | 1,599 |
| 4 | 30/30/30/10$^C$ | 19.6 | 4.0 | 1,487 |
| 5 | 0/45/40/15 | NP | — | — |
| 6 | 0/45/40/15$^C$ | NP | — | — |

Note:
The C index indicates that the used starch was waxy starch. NP means non-processable.

Figure 2:
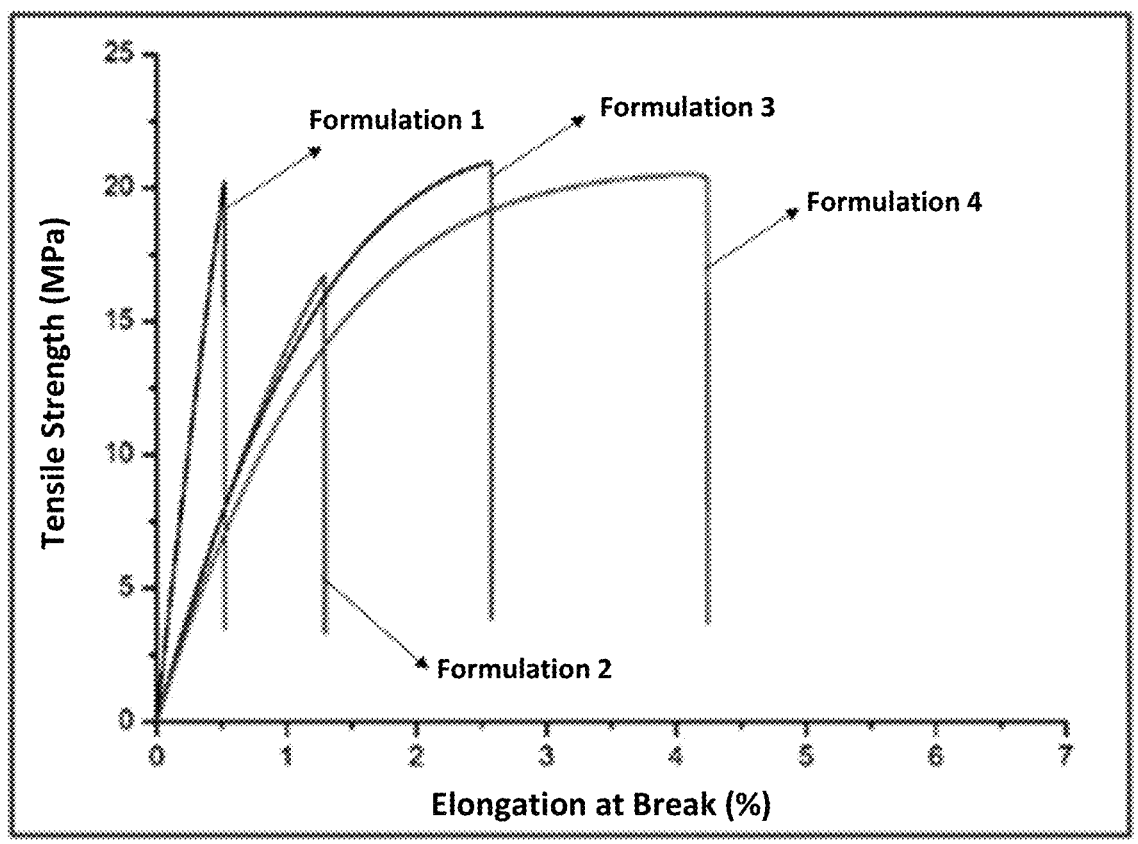
FIG. 02 represents a graph of Tensile Strength (MPa) vs Elongation at Break (%), which shows the representative curves for formulations 1 to 4 of the example of the invention.

FIG. 02 corresponds to a graph of Tensile Strength (MPa) versus Elongation at Break (%), which shows the representative curves for formulations 1 to 4.

Formulations 5 and 6 were considered non-processable, as they did not have sufficient strength in the molten for the processing of the part.

As noted in the graphics, PHB provides high rigidity, but makes the product less impact resistance. This can be understood by the low Elongation at Break value—the lower the Elongation at Break, the more brittle the piece is—therefore, the lower values, worse the result (formulation 1 is the most brittle).

PBAT provides flexibility to the part and increases impact resistance in addition to being biodegradable.

When evaluating extrusion, injection, and tensile properties, it was found that higher contents of PBAT made it difficult to cut the extrudate and to obtain specimens by injection due to its high flexibility and low glass transition temperature respectively.

The data shown in the present study show the importance of combining the constituents of the composition of the present invention: flexible polymer, rigid polymer, and lignin, in correct dosages to obtain good mechanical properties. The synergy of the components is clear, as they do not show good results when used alone.

The composition of the tested formulations and the amount incorporated of each component was defined aiming to obtain a balance between resistance in the molten state, stiffness, impact resistance and biodegradability.

The invention claimed is:

1. A biodegradable and/or compostable thermoplastic composition comprising:
 a. 30 to 70% by weight of lignin;
 b. 30 to 60% by weight of a rigid polymer; and
 c. 10 to 40% by weight of a flexible polymer;
 wherein the rigid polymer is poly(hydroxybutyrate) (PHB); and
 the flexible polymer is poly(butylene adipate-co-terephthalate) (PBAT).

2. The biodegradable and/or compostable thermoplastic composition according to claim 1, wherein the composition comprises 40 to 50% by weight of lignin.

3. The biodegradable and/or compostable thermoplastic composition according to claim 1, wherein the composition comprises 30 to 40% by weight of the rigid polymer.

4. The biodegradable and/or compostable thermoplastic composition according to claim 1, wherein the composition comprises 20 to 30% by weight of the flexible polymer.

5. The biodegradable and/or compostable thermoplastic composition according to claim 1, wherein the rigid polymer has a tensile elastic modulus from 1800 to 4600 MPa.

6. The biodegradable and/or compostable thermoplastic composition according to claim 5, wherein the rigid polymer has a tensile elastic modulus from 2700 to 4200 MPa.

7. The biodegradable and/or compostable thermoplastic composition according to claim 1, wherein the rigid polymer has a flexural elastic modulus from 2000 to 5000 MPa.

8. The biodegradable and/or compostable thermoplastic composition according to claim 7, wherein the rigid polymer has a flexural elastic modulus from 3000 to 4500 MPa.

9. The biodegradable and/or compostable thermoplastic composition according to claim 1, wherein the rigid polymer is selected from the group consisting of bioplastics from renewable, nonrenewable, biodegradable and compostable sources.

10. The biodegradable and/or compostable thermoplastic composition according to claim 1, wherein the flexible polymer has a tensile elastic modulus from 50 to 1000 MPa.

11. The biodegradable and/or compostable thermoplastic composition according to claim 10, wherein the flexible polymer has a tensile elastic modulus from 100 to 500 MPa.

12. The biodegradable and/or compostable thermoplastic composition according to claim 1, wherein the flexible polymer is selected from the group consisting of bioplastics from renewable, nonrenewable, biodegradable and compostable sources.

13. The biodegradable and/or compostable thermoplastic composition according to claim 1, further comprising a biodegradation rate accelerator.

14. The biodegradable and/or compostable thermoplastic composition according to claim 13, wherein the biodegradation rate accelerator is a polysaccharide or lignocellulosic material.

15. The biodegradable and/or compostable thermoplastic composition according to claim 14, wherein the biodegradation rate accelerator is starch, thermoplastic starch, or cellulose.

16. The biodegradable and/or compostable thermoplastic composition according to claim 1, for use in the production of a rigid part.

17. The biodegradable and/or compostable thermoplastic composition according to claim 16, wherein the rigid part is intended for application in a sector selected from the group consisting of forestry, agricultural, packaging and consumer goods, automotive, and civil construction sector.

18. The biodegradable and/or compostable thermoplastic composition according to claim 16, wherein the rigid part is in the form of tubes.

19. The biodegradable and/or compostable thermoplastic composition according to claim 18, wherein the tubes are intended for application in the forestry sector or agricultural sector.

20. A biodegradable and/or compostable thermoplastic composition defined in claim 1, for use in plastics transformation processes.

21. A process of use of a biodegradable and/or compostable thermoplastic composition defined in claim 1 comprising manufacturing a rigid part.

22. The process of use according to claim 21, wherein the rigid part is for application in a sectorseeters selected from the group consisting of forestry, agricultural, packaging and consumer goods, automotive, and civil construction sectorsectors.

23. The process of use according to claim 21, wherein the rigid part is in the form of tubes.

24. The process of use according to claim 23, wherein the tubes are intended for application in the forestry or agricultural sector.

25. A product, comprising a biodegradable and/or compostable thermoplastic composition defined in claim 1.

26. The product according to claim 25, in the form of a rigid part.

* * * * *